Dec. 13, 1960   C. H. CROSBY ET AL   2,963,849
WIRE GUIDES FOR STRANDING CABLER
Filed March 9, 1959   2 Sheets-Sheet 1
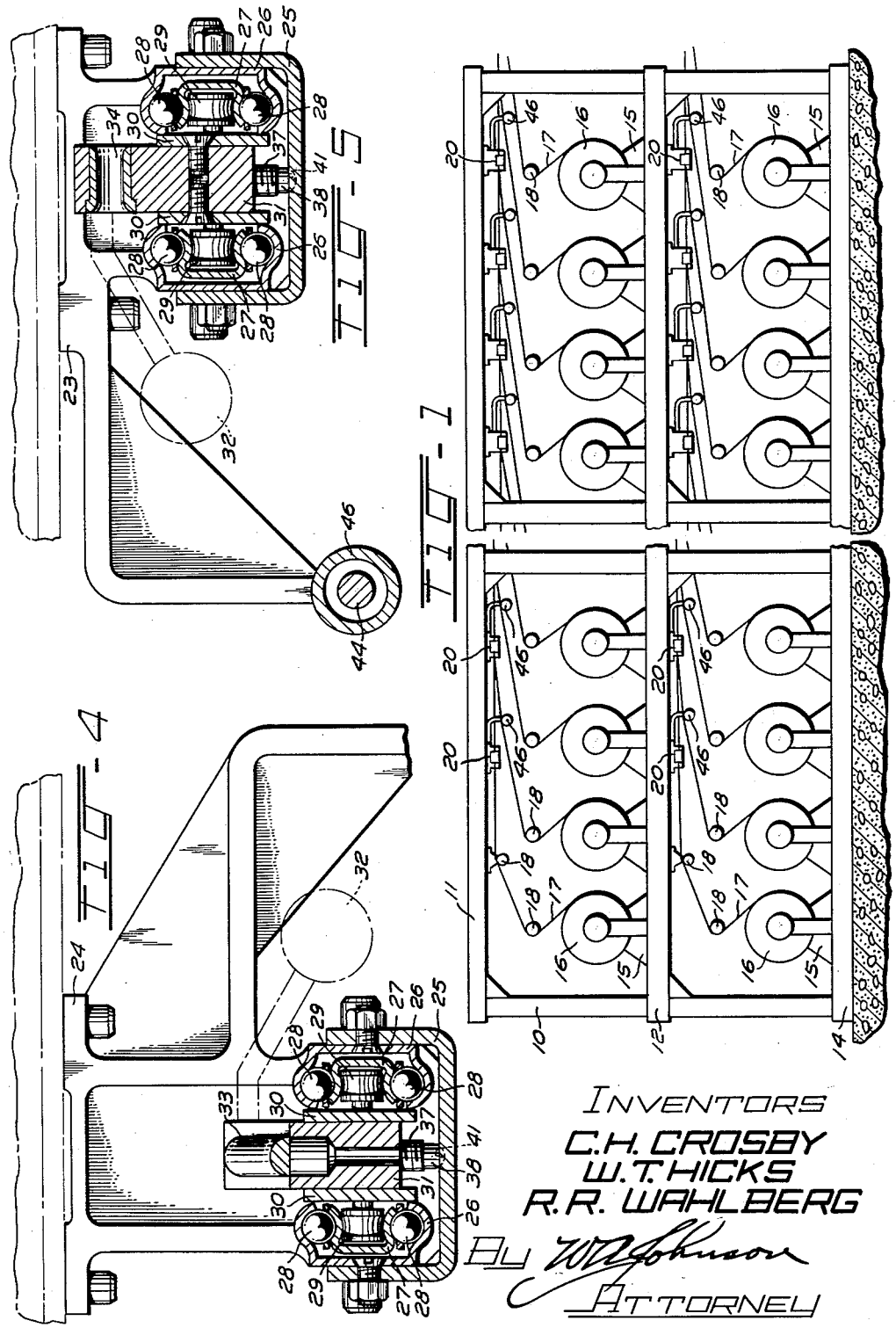
INVENTORS
C. H. CROSBY
W. T. HICKS
R. R. WAHLBERG
By W. D. Johnson
ATTORNEY Dec. 13, 1960 C. H. CROSBY ET AL 2,963,849
WIRE GUIDES FOR STRANDING CABLER
Filed March 9, 1959 2 Sheets-Sheet 2
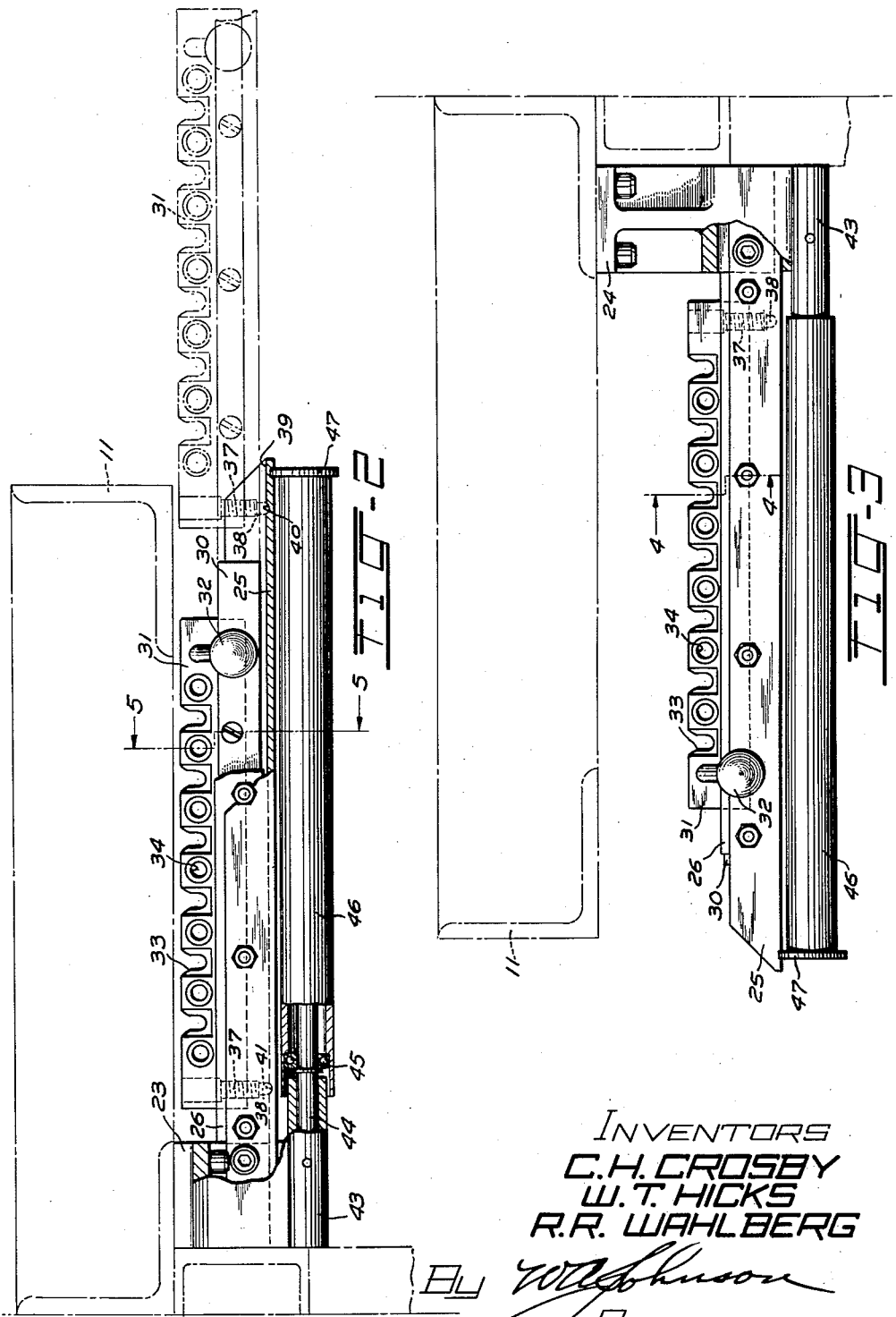
INVENTORS
C. H. CROSBY
W. T. HICKS
R. R. WAHLBERG
BY
ATTORNEY

United States Patent Office 2,963,849
Patented Dec. 13, 1960

2,963,849

WIRE GUIDES FOR STRANDING CABLER

Charles H. Crosby, Cranford, William T. Hicks, Glen Rock, and Roger R. Wahlberg, Bloomfield, N.J., assignors to Western Electric Company, Incorporated, New York, N.Y., a corporation of New York Filed Mar. 9, 1959, Ser. No. 798,172

8 Claims. (Cl. 57—106)

This invention relates to strand guides particularly guides for use in a cable stranding machine.

In stranding machines or stranding cablers, the individual or pairs of strands are pulled longitudinally from supply reels to positions where they are formed into single or multi-unit cables. Great care must be taken in guiding the strands from their supply reels until they are formed into their particular groups in forming the cables. Some cables require numerous single or double strands and to conserve space, it is important that the supply reels be disposed as closely as possible to each other. This condenses the area through which the strands may travel before they meet in their respective groups and also condenses the area in which guide means may be disposed to suitably guide the strands in their respective paths before being brought together in cable units. In setting up to make each cable, the strands must be threaded through their guides and in the congested areas adjacent the supply reels this is a tedious operation.

The object of this invention is to facilitate this type of threading operation.

In accordance with the object, apertured guides, for strands in an apparatus for forming a cable thereof while being advanced longitudinally from a row of supply reels mounted for rotation in a supporting frame, are supported in groups by carriages, the carriages in turn being supported for movement between stranding positions within the frame and threading positions outside the frame.

More specifically, the guides are disposed in rows on their carriages and the carriages have spring pressed plungers adapted to engage inner and outer recesses of the carriage support to locate each carriage with its group of guides either in the stranding or the threading position. Furthermore, the guides are alternately U-shaped and O-shaped and arranged in the various groups so that each series of aligned guides will alternately be U-shaped and O-shaped to facilitate threading of the strands therethrough.

Other objects and advantages will be apparent from the following detailed description when considered in conjunction with the accompanying drawings wherein:

Fig. 1 is a side elevational view of a group of supply units of a cable forming apparatus embodying the guide units;

Fig. 2 is a side elevational view of one of the guide units shown with the carriage in solid lines in the stranding position and in dotted lines in the threading position;

Fg. 3 is a side elevational view of another of the guiding units;

Fig. 4 is an enlarged vertical sectional view taken along the line 4—4 of Fig. 3, and;

Fig. 5 is a vertical sectional view taken along the line 5—5 of Fig. 2.

The structure shown in Fig. 1 illustrates a main frame 10 having longitudinal portions 11, 12 and 14, the portions 12 and 14 having supply units 15 mounted thereon for supporting supply reels 16 loaded with single or multiple strands 17. In the present instance, the frame 10 houses four rows of supply units 15, two upper and two lower, only two of the rows being shown in Fig. 1. When the strands leave their supply reels 16 they travel over elongate rollers 18 toward their respective guide units 20.

The guide units 20 appear to be of different contours in Fig. 1. These units are substantially identical in structure, the difference in appearance in Fig. 1 being in the vertical dimensions of their supporting means to locate the groups of guides at different positions or levels to assure smooth uninterrupted travel of the strands. This difference is made apparent by viewing Figs. 2 and 3. The unit 18 shown in Fig. 2 is positioned closely adjacent the longitudinal member 11 on one side of the frame 10 with what may be termed a short mounting bracket 23 whereas the unit 18 of Fig. 3 disposed on the other side of the frame is spaced downwardly from the longitudinal frame member 11 a greater distance by a longer bracket 24. With the exception of the lengths of the brackets the units differ only in the positions of the guides. Each unit 18 has a U-shaped support 25 or holder fixed to its bracket 23—24 at one end with tracks 26, Figs. 4 and 5, mounted therein. The tracks 26 have slides 27 supported by bearing members 28, the slides having sets of supporting rollers 29 ridable therein. The rollers 29 are secured to opposite side members 30 of a carriage 31 which is movable longitudinally in its supporting means by a handle 32. The carriage has its upper surface formed to receive and support groups of aperture guides. The guides are U-shaped as at 33 and O-shaped as at 34 and alternately positioned in a row aligning the top of the carriage. The guides 33—34 are purposely arranged in the units 20 so that the aligned guides, longitudinally of the frame, will include alternately a O-shaped guide and a U-shaped guide.

The handles 32 are mounted on the outer ends of the carriages to facilitate movement of the carriages between a stranding position shown in solid lines in Fig. 2 and a threading position shown in dotted lines in this figure. A locating element 37 carrying a spring pressed plunger or ball member 38 is mounted on the inner end of each carriage and adapted to ride on the surfaces 39 of the support 25 between recesses 40 and 41. The recesses 40 and 41 cooperate with the locating element 37 to receive the ball member or plunger 38 to removably retain and locate the carriage in the stranding and threading positions.

Each supporting bracket 23—24 has a hollow tubular portion 43 in which one end of a rod 44 is mounted. The rod 44 extends substantially the full length of the U-shaped support 25 and has bearings 45 only one of which is shown disposed at spaced positions to rotatably support an elongate roller 46. An enlarged end 47 of the roller prevents the strands from leaving the roller. The rollers 46 as illustrated in Fig. 1 assist in supporting strands from one supply reel directed to the next adjacent guide unit 20.

*Operation*

When the cable forming apparatus is to be conditioned to form a cable of a given size with a predetermined number of single or double strands, the units 15 in the frame 10 are loaded with the desired number of supply reels 16. At this time all of the carriages 31 of the guide units 20 are moved outwardly into their threading positions where they are held by the locating elements 37 to align the apertured guides of the various units. The strands may be moved over their elongate rollers initially or after the strands have been threaded through their respective guides. The threading may be done in any desirable manner beginning at either end of each row of supply reels. It should be understood, however, that certain of the guides receive more than one strand or group of strands. The groups of guides when in the threading positions are out of the congested area of the frame 10 where accurate threading of the strands is assured, the apertured guides being clearly visible until the threading operation is completed. At that time the carriages may be moved inwardly as a group or individually causing the strands to travel over their respective guide rollers 18 and also over their respective guide rollers 46 of the guide units 20. When the carriages 31 with their apertured guides have been moved from the threading position to the stranding position, the apparatus may be started to advance the strands longitudinally from the supply reels 16 over their guide rollers and through their respective apertured guides of the units 20. If a strand should break during operation of the apparatus, it may be located readily and connected by moving certain or all the carriages to the threading position.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for forming a cable of strands advanced longitudinally from a row of supply reels mounted for rotation in a supporting frame, apertured groups of guides for the strands, carriages supporting groups of the guides, holders mounted in the frame at spaced positions, tracks disposed in the holders to support the carriages in the frame to hold the guides in stranding positions therein and to support the carriages for movement with the guides into threading positions outside the frame.

2. In an apparatus for forming a cable according to claim 1 in which locating elements movable with the carriage cooperates with stationary portions of the holders to removably locate the carriage respectively in the stranding and the threading positions.

3. In an apparatus for forming a cable according to claim 1 in which some of the guides are substantially U-shaped in cross-section while the other guides are substantially O-shaped in cross-section.

4. In an apparatus for forming a cable according to claim 1 in which handles for use in moving the carriages on their tracks are mounted thereon in positions out of the paths of the strands.

5. In an apparatus for forming a cable according to claim 2 in which the locating elements movable with the carriages are spring pressed plungers cooperating with recesses in the holders to locate the carriages with their respective guides aligned in both stranding and threading positions.

6. In an apparatus for forming a cable according to claim 1 in which the carriages are elongate bars supporting the guides in predetermined locations spaced longitudinally thereof, and spaced rollers extend laterally from the sides of the carriages to ride on the tracks.

7. In an apparatus for forming a cable according to claim 6 in which series of bearings carried by the tracks are positioned to be engaged by the rollers to facilitate movement of the carriage between the threading and stranding positions.

8. In an apparatus for forming a cable according to claim 7 in which members mounted on certain of the holders guide strands from their supply reels to guides of other carriages.

References Cited in the file of this patent

UNITED STATES PATENTS

| | | |
|---|---|---|
| 1,113,434 | Hartley | Oct. 13, 1914 |
| 1,911,925 | Reed | May 30, 1933 |
| 2,322,825 | Carlson | June 29, 1943 |
| 2,377,173 | Nelson | May 29, 1945 |
| 2,640,664 | Porter | June 2, 1953 |